United States Patent [19]

Mercati et al.

[11] Patent Number: 4,517,355
[45] Date of Patent: May 14, 1985

[54] FLAMEPROOF LINEAR POLYESTER, A PROCESS FOR ITS PREPARATION, AND ARTICLES FORMED FROM SAID POLYESTER

[75] Inventors: Giorgio Mercati, Monza; Armando Mariano, Pisticci Scalo; Fulvio Pertot, Crema; Antonio Glionna; Mario Ferri, both of Matera, all of Italy

[73] Assignee: Anic S.p.A., Palermo, Italy

[21] Appl. No.: 486,902

[22] Filed: Apr. 20, 1983

[51] Int. Cl.$^3$ .................... C08G 63/68; C08G 79/02
[52] U.S. Cl. .................................. 528/287; 528/275
[58] Field of Search ............................... 528/287, 275

[56] References Cited

U.S. PATENT DOCUMENTS

| Re. 30,783 | 10/1981 | Kleiner et al. | 528/287 |
| 4,033,936 | 7/1977 | Bollert et al. | 528/287 |
| 4,169,935 | 10/1979 | Hoheisel et al. | 528/287 |
| 4,214,069 | 7/1980 | Couchoud et al. | 528/287 X |

Primary Examiner—Lucille M. Phynes
Attorney, Agent, or Firm—Hedman, Gibson, Costigan & Hoare

[57] ABSTRACT

A flameproof linear polyester is described containing, copolymerized in the molecule, a phosphorus compound of formula:

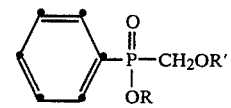

where R is a hydrogen atom, an alkyl group with 1 to 4 carbon atoms or a hydroxyalkyl group, and R' is a hydrogen atom, a hydroxyalkyl group or the group —(CH$_2$CH$_2$O)$_n$H, where n varies from 1 to 4. Said linear polyester is prepared by firstly forming a low molecular weight precondensate from a dicarboxylic aromatic acid (or a relative lower alkyl diester) and an alkylene glycol, and then polycondensing in the presence of said phosphorus compound, in such a quantity as to obtain a content of phosphorus (expressed as the metal) in the linear polyester of between 0.4 and 0.8% by weight. The linear polyester thus obtained can be formed into articles such as fibres, film, sheets and other articles which, besides being flameproof, possess improved dyeing characteristics. A process is also described for preparing the phosphorus compounds corresponding to the aforesaid general formula, where R is hydrogen or an alkyl group containing 1 to 4 carbon atoms, and R' is hydrogen. Said phosphorus compounds are prepared by reacting phenylphosphinic acid or ester with paraformaldehyde, at a temperature of between 60° and 150° C.

11 Claims, No Drawings

FLAMEPROOF LINEAR POLYESTER, A PROCESS FOR ITS PREPARATION, AND ARTICLES FORMED FROM SAID POLYESTER

This invention relates to a flameproof linear polyester, and the process for its preparation.

The invention also relates to articles formed from said flameproof linear polyester. Finally, the invention relates to a process for preparing copolymerisable phosphorous monomers able to flameproof linear polyesters.

Linear polyesters are prepared in the known art by polycondensing dicarboxylic aromatic acids with alkylene glycols, particularly terephthalic acid (or its methyl diester), with ethylene glycol in the presence of suitable catalysts. The linear polyesters thus obtained are valuable products in that they constitute the raw materials for interesting articles such as fibres, film, sheets and other articles.

A drawback of these articles is their inflammability, with all its consequent risks, especially in the textile and electrotechnical sectors.

Various flameproofing agents have therefore been proposed for applying to the linear polyester either by surface treatment or by addition during its processing, for example during spinning.

Thus tris-dibromopropyl phosphate has been used in the textile sector as a finishing agent. However its resistance to washing is not completely satisfactory, and it also manifests a certain toxicity. It is also known to add brominated flameproofing agents during the spinning stage. However, there are difficulties in obtaining stable brominated compounds which do not decompose under the temperature conditions during spinning and the other fibre treatment operations.

In the known art it has also been proposed to add special reactive phosphorus-containing monomers during polycondensation of the dicarboxylic aromatic acid with the alkylene glycol. With these known monomers, linear polyesters are obtained which have an acceptable flame resistance only when the quantity of phosphorus (expressed as the metal) in the polymer exceeds about 1% by weight. However, these phosphorus levels mean that undesirable changes occur in the linear polyester characteristics, and there is an economical problem because of the relatively high quantity of phosphorus monomer introduced into the polymer. A special phosphorous monomer copolymerisable with dicarboxylic aromatic acid and alkylene glycol has now been found which is able to give the linear polyester good flameproof characteristics when present in said polyester at low levels, and in any case at levels less than those usual in the known art.

Thus, one object of the present invention is a new linear polyester with flameproof characteristics.

A further object of the present invention is the process for preparing said flameproof linear polyester.

A further object of the present invention is represented by the articles formed from said flameproof linear polyester.

A further object of the invention is a process for preparing copolymerisable phosphorus monomers able to flameproof linear polyesters.

Further objects of the invention will be apparent from the description given hereinafter.

In particular, the flameproof linear polyester of the present invention is the product of the polycondensation of a dicarboxylic aromatic acid (or a relative lower alkyl diester) with an alkylene glycol, which contains bonded in the macromolecule a phosphorus compound of formula:

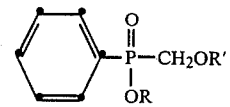

where R is a hydrogen atom, an alkyl group with 1 to 4 carbon atoms or a hydroxyalkyl group, and R' is a hydrogen atom, a hydroxyalkyl group or the group —$(CH_2CH_2O)_nH$, where n varies from 1 to 4; the quantity of said bonded monomer being such as to obtain a quantity of phosphorus (expressed as the metal) in the linear polyester of between 0.4 and 0.8% by weight.

One example of a hydroxyalkyl group of the aforesaid general formula is the group —$CH_2CH_2OH$—.

One class of phosphorus compounds useful for the purpose of the present invention is that corresponding to the aforesaid general formula in which R' is hydrogen, and R is hydrogen or an alkyl group containing 1 to 4 carbon atoms.

A process for preparing phosphorus compounds pertaining to said class is described hereinafter.

In particular, said process consists essentially of reacting phenyl phosphinic acid or ester and paraformaldehyde at a temperature of between 60° and 150° C. in the absence of a solvent. Advantageously, the chosen temperature is such as to maintain the reaction mass in the molten state, and thus lower (between 80° and 110° C.) if reacting the esters of phenylphosphinic acid, which are liquid, but higher (between 130° and 140° C.) if reacting the free acid.

It is known (DOS No. 2,226,406) that alkylphosphinic esters react with formaldehyde, preferably paraformaldehyde, to give esters of hydroxymethylalkylphosphinic acid:

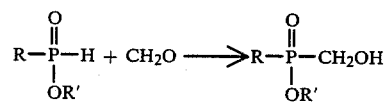

The literature also describes the synthesis of hydroxymethylphenyl phosphinic acid by reacting phenylphosphinic acid with formalin (formaldehyde in solution) catalysed by ammonium chloride (Zhuernal Obshchei Khimii vol. 47, No. 7, pag. 1465–1468, July 1977), but it is apparent from the reported data (melting point of 80° greater than that effectively found) that the product obtained either did not correspond to the exact structure attributed to it, or was polluted by considerable quantities of different reaction products. It has now been found that phenylphosphinic acid esters and even the free acid also react with paraformaldehyde in the absence of any catalyst, to give hydroxymethylphenylphosphinic acid with high yields which exceed 80%.

The reaction takes place very simply in the absence of solvent. In reacting the phenylphosphinic acid esters, the operation is preferably carried out between 80° and 110° C., as these are liquid substances.

When operating with phenylphosphinic acid, a higher temperature must be used, between 130° and 140° C., in order to always keep the reaction mass completely molten.

Under these conditions a partial condensation of hydroxymethylphosphinic acid can take place, shown by the development of water and by TLC analysis.

Oligomers of type:

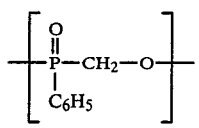

are formed, but these can be easily hydrolysed by adding water to the reaction mass and boiling for some hours.

The acidity of the monomer itself is sufficient to complete the hydrolysis.

The starting substances, ie the phenylphosphinic acid and its esters, can be prepared form dichlorophenylphosphine by known methods (see Houben Weyl, XII, I, pag. 294 and 322).

As also stated by DOS No. 2,226,406 for analogous products of this class, these new products are useful as intermediates in the production of flameproofing agents, plant protectives etc. Their bifunctional structure and their molecular characteristics also enable them to be used as monomers for polycondensation resins, which is not so in the case of the corresponding hydroxymethylalkylphosphinic acids or esters. In this respect, even alone, hydroxymethylphenylphosphinic acid tends to polycondense above 130° to evolve water, whereas the ester derivatives transesterify. The phenomenon becomes particularly apparent above 200° C.

The new products obtained have been identified by elementary analysis, by acidimetric determination of equivalent weight, by infrared spectroscopy, by NMR and by mass spectrometry.

The process for preparing the flameproof linear polyester according to the present invention comprises the initial formation of a low molecular weight precondensate from the dicarboxylic aromatic acid (or a relative lower alkyl diester) and the alkylene glycol. A suitable quantity of the aforesaid phosphorus compound is then added to the precondensate, and polycondensation is carried out until the proper molecular weight values of the linear polyesters are obtained.

Dicarboxylic acids suitable for preparing the linear polyester are the dicarboxylic aromatic acids such as terephthalic acid, isophthalic acid, 5-sulphoisophthalic acid, diphenyl-para,para-dicarboxylic acid and para-phenylenediacetic acid. Of these, terephthalic acid is preferred. The alkylene glycols suitable for the purposes of the present invention are ethylene glycol, 1,3-propanediol, 1,4-butanediol and higher homologues. Of these, ethylene glycol is preferred. In preparing the low molecular weight precondensate, the prechosen dicarboxylic aromatic acid and alkylene glycol are reacted in a molar ratio of the order of 1:1.5, operating at a temperature in the range of 180°–240° C. and under autogenous pressure, (from about 1.8 to 2.2 kg/cm$^2$), possibly in the presence of catalysts such as amines, quaternary ammonium bases, metals, metal oxides or organic or inorganic metal salts. In industrial practice, metal oxides such as Sb$_2$O$_3$ or metal acetates or their relative mixtures are used. Conveniently, the quantity of catalyst is of the order of 0.15–0.03% with respect to the dicarboxylic aromatic acid. Under these conditions, a precondensate is obtained having a molecular weight of between about 400 and about 1000, and typically of the order of 500, with a reaction time of between 1 and 6 hours.

Instead of the dicarboxylic aromatic acid, the relative lower alkyl diester can be used (generally methyl diester) and the precondensate can be formed by transesterification. In all cases, a phosphorus monomer chosen from those of the aforesaid general class is added to the precondensate thus obtained.

Specific examples of these phosphorus-containing monomers are: phenylhydroxymethylphosphinic acid and methyl and ethyl phenylhydroxymethylphosphinite.

The poycondensation is then effected, operating at a temperature of between 265° C. and 280° C. under a pressure which decreases from 760 torr to less than one torr in the presence of catalysts chosen from those indicated in relation to the precondensation, and in particular metals, metal oxides and organic and inorganic metal salts, preferably metal oxides such as Sb$_2$O$_3$, possibly adding stabilizing agents for protecting the polymer from degradation in the subsequent fusion for further formation, such as phosphoric acid, triphenylphosphite and the like.

Conveniently, said catalysts are used in a quantity of the order of 0.1–0.03% by weight with respect to the initially fed aromatic dicarboxylic acid.

With a total reaction time of the order of 3–8 hours, the content of three carboxylic groups is reduced to values of the order of 10–20 meq/kg, and the linear polyester of the present invention is obtained with an intrinsic viscosity typically within the range of 0.60–0.65.

This linear polyester shows good flame proof characteristics, as appear from its LOI (Limiting oxygen index, ASTM 2863) values given in the experimental examples which follow.

These LOI values are obtained with low phosphorus levels in the linear polyester, confirming the marked flame proofing characteristics of the phosphorus-containing monomers according to the present invention. The presence of these monomers does not negatively influence any of the inherent characteristics of the linear polyesters, and infact improves their facility for dyeing.

The flame proof linear polyesters of the present invention can be formed into articles such as fibres, film and sheets by the methods usually used for this purpose.

Some experimental examples of the preparation of preferred phosphorus compounds are described hereinafter.

EXAMPLE 1

100 g (0.70 moles) of phenylphosphinic acid (M.P. 80°–81° C.) are heated to 120° C. Keeping the molten mass under agitation, 22 g (0.73 moles) of paraformaldehyde are added in small portions. The temperature rises due to the exothermic nature of the reaction, and the addition of paraformaldehyde is regulated so that the temperature does not exceed 140° C. Having completed the addition, the reaction mass is left at 140° C. for about one hour, until TLC analysis shows the complete disappearance of the starting substance. 100 ml of water are then added, and the mixture is kept under agitation for 5 hours. The water is evaporated under vacuum, the mixture is taken up in isopropanol (200 ml), and the isopropanol is partly evaporated in order to completely remove the water by utilising the azeotrope provided by the alcohol. Hydroxymethylphenylphosphinic acid crystallises on cooling. 103 g of product are obtained with a M.P. of 138°-9° C. and a yield of 85.1%.

A further 14 grams of product with a M.P. of 133°-6° C. are obtained by concentrating the mother liquors.

The analytical data of the product are as follows:
Elementary analysis:

| C | 49.0% (theoretical 48.9%) |
| H | 5.34% (theoretical 5.3%) |
| P | 18.12% (theoretical 18.0%) |

Acidimetric equivalent 171.4 (theoretical 172.1)
Infrared spectrum:

| $\nu$O—H (alcoholic) | 3480 cm$^{-1}$ s |
| $\nu$O—H (acid) | 1600 cm$^{-1}$ m-broad |
| $\nu$P = O | 1150 cm$^{-1}$ s |

Further bands: 1430 cm$^{-1}$s; 1210 cm$^{-1}$ms; 1060 cm$^{-1}$s; 960 cm$^{-1}$s; 850 cm$^{-1}$m; 760 cm$^{-1}$m; 730m; 680m. (s=strong; ms=medium-strong; m=medium).

Ultraviolet spectrum (solvent water):

| $\lambda$ (nm) | $\epsilon$ |
| --- | --- |
| 262 | 330 |
| 210 | 5600 |
| 195 | 13000 |

H-NMR(CD$_3$OD) (ppm)
$\delta$3.90(2H,d,J=5H$_z$)
$\delta$7.4-8(5H,m,arom)

Mass Spectrometry (executed on the silanised compound): m/c (relative intensity %) 73 (100); 45 (60); 121 (40); 75 (36); 135 (34); 301 (28); 43 (25); 47 (24); 316 (0.8) M$^+$ (carried out with a mass spectrometer mod LKB 9000 at 70 eV).

EXAMPLE 2

100 g (0.5 moles) of phenylphosphinic acid ethyl ester are heated to 80° C., and 15 g (0.52) of paraformaldehyde are added in small portions. The paraformaldehyde addition is regulated so that the temperature does not exceed 110° C. by virtue of the exothermic nature of the reaction. When the addition is complete, the mixture is kept for about one hour under agitation at 110° C., and the termination of the reaction can be seen by gas chromatography or thin layer chromatography. 100 cc of a 10% HCl solution are then added, and the mixture kept at 80° C. for 30 min. The water and hydrochloric acid are then evaporated under vacuum, and the mixture taken up in isopropanol. On cooling, 69.3 g of hydroxymethylphenylphosphinic acid are obtained with a yield of 80.5% and a melting point of 138°-9° C.

On concentrating the mother liquors, a further 9 g are obtained with a M.P. of 134°-6° C.

The analytical data of the product are analogous to those of Example 1.

EXAMPLE 3

The procedure of Example 2 is followed, with the exception that the hydrolysis is not effected.

The reaction mass is kept under vacuum (0.1 torr) for 1 hour at 80° C. The ethylhydroxymethylphenylphosphinite which forms is shown to be present to the extent of 95% by gas chromatography. Any attempt to distil the ester leads to the development of ethyl alcohol, while a polymer of vitreous appearance is obtained which on hydrolysis with concentrated HCl gives hydroxymethylphenylphosphinic acid.

The analytical data of the obtained hydroxymethylphenylphosphinite are as follows:
Ultraviolet spectrum (solvent water):

| $\lambda$ (nm) | $\epsilon$ |
| --- | --- |
| 262 | 740 |
| 216 | 8500 |
| 195 | 12000 |

Elementary analysis:

| P | 15.20% (theoretical 15.5%) |

Infrared spectrum:

| $\nu$O—H | 3240 cm$^{-1}$ s |
| $\nu$A$_r$—H | 3035 cm$^{-1}$ w |
| $\nu$P = O | 1190 cm$^{-1}$ s |

Other bands: 2990 cm$^{-1}$w; 2910 cm$^{-1}$w; 1590 cm$^{-1}$w; 1440 cm$^{-1}$s; 1120 cm$^{-1}$s; 1030 cm$^{-1}$s; 960 cm$^{-1}$s; 860 cm$^{-1}$m; 740 cm$^{-1}$m; 690 cm$^{-1}$m. (s=strong; m=medium; w=weak).

$^1$H-NMR (C$_6$D$_6$ at 55° C.):
$\delta$4.19 (2H, d, J=4 Hz)
$\delta$7.2-8.2 (5H, m, arom)
$\delta$3.95 (2H, q, J=7)
$\delta$1.08 (3H, t, J=7)
$\delta$1.08 (3H, t, J=7)
$\delta$3.95 (2H, q, J=7)
$\delta$4.19 (2H, d, J=4 HzP-CH$_2$)
$\delta$7.2-8.2 (5H, m, arom)

Mass Spectrometry m/e (relative intensity %): 141 (100); 77 (40); 170 (34); 169 (21); 142 (16); 51 (12); 78 (11); 47 (9); 200 (3) M$^+$. (Using a mass spectrometer mod LKB 9000s at 70 eV).

Experimental examples are described hereinafter of the preparation of the flame proof linear polyester. In these examples, the inflammability was determined in accordance with the ASTM 2863 standard, which measures the percentage of oxygen (contained in a nitrogen-oxygen mixture) necessary and sufficient to maintain the combustion of the linear polyester sample under examination.

The greater the quantity of oxygen necessary for this purpose, the lower the inflammability of the sample under examination.

EXAMPLE 4

1 part by weight of ethylene glycol and 1.8 parts by weight of terephthalic acid are fed into an autoclave. The mixture is prepolymerised at a temperature of 235° C. under a pressure of 2.0 kg/cm$^2$ and in the presence of 0.03% by weight (with respect to the terephthalic acid) of a quaternary ammonium base, until a precondensate having an average molecular weight of about 500 is obtained.

This precondensate is used in the following experimental polycondensation examples.

EXAMPLE 5

150 parts by weight of the precondensate of Example 4, 4.7 parts by weight of phenylhydroxymethylphosphinic acid and 0.04% by weight (referred to the precondensate) of $H_3PO_4$ and $Sb_2O_3$ are fed into an autoclave. The agitated mass is heated to 270°–280° C., and the pressure is reduced from 760 torr to less than 1.0 torr during the course of 1.5 hours.

The reaction is made to proceed under vacuum for a further 2 hours, and at the end of this period a linear polyester is obtained having the following characteristics:

| | |
|---|---|
| intrinsic viscosity | 0.65 |
| (determined in o-chlorophenol at 25° C.) | |
| COOH | 17 meq/kg |
| (free acid groups) | |
| Tm | 248° C. |
| (endothermic melting point measured by DSC) | |
| DEG | 1.6% by weight |
| (percentage by weight of ether units determined by gas chromatography measurement on a saponified and acetylated sample) | |
| LOI | 29 vol % |
| (Limiting oxygen index - by ASTM 2863) | |
| phosphorus | 0.62% by weight |

In determining the LOI, the polymer granules are moulded in order to obtain test pieces suitable for the purpose.

EXAMPLE 6

150 parts by weight of the precondensate of Example 4, 4.7 parts by weight of phenylhydroxymethylphosphinic acid and 0.04% by weight (referred to the precondensate) of titanium tetraisopropylate are fed into an autoclave. The mixture is polymerised in the manner of Example 5, and a linear polyester is obtained having the following characteristics:

| | |
|---|---|
| intrinsic viscosity | 0.63 |
| COOH | 18 meq/kg |
| Tm | 247° C. |
| LOI | 29 vol % |
| phosphorus | 0.60% by weight |

EXAMPLE 7

150 parts by weight of the precondensate of Example 4, 5.6 parts by weight of ethyl phenylhydroxymethylphosphinite and 0.04% by weight (referred to the precondensate) of $H_3PO_4$ and $Sb_2O_3$ are fed into an autoclave. The mixture is polymerised by the method of Example 5, and a linear polyester is obtained having the following characteristics:

| | |
|---|---|
| intrinsic viscosity | 0.64 |
| COOH | 16.0 meq/kg |
| Tm | 248° C. |
| LOI | 29 vol % |
| phosphorus | 0.60% by weight |

EXAMPLE 8

A precondensate is prepared by the method of Example 4 from 1 part by weight of ethylene glycol, 1.6 parts by weight of terephthalic acid and 0.2 parts by weight of isophthalic acid.

This precondensate is then polymerised by the method described in Example 5.

A linear polyester is obtained having the following characteristics:

| | |
|---|---|
| intrinsic viscosity | 0.60 |
| COOH | 15 meq/kg |
| Tm | 240° C. |
| LOI | 29 vol % |
| phosphorus | 0.61% by weight |

EXAMPLE 9 (reference)

150 parts by weight of the precondensate of Example 4 and 0.04% by weight (referred to the precondensate) of $H_3PO_4$ and $Sb_2O_3$ are fed into an autoclave.

On polymerising by the method of Example 5, a linear polyester is obtained having the following characteristics:

| | |
|---|---|
| intrinsic viscosity | 0.66 |
| COOH | 12 meq/kg |
| Tm | 257° C. |
| LOI | 21 vol % |

EXAMPLE 10

150 parts by weight of the precondensate of Example 4, 3 parts by weight of phenylhydroxymethylphenylphosphinic acid and 0.04% by weight (referred to the precondensate) of $GeO_2$ are fed into an autoclave.

The mixture is polymerised by the method of Example 5, and a linear polyester is obtained having the following characteristics:

| | |
|---|---|
| intrinsic viscosity | 0.64 |
| COOH | 14 meq/kg |
| Tm | 251° C. |
| LOI | 27 vol % |
| phosphorus | 0.41% |

The flameproof linear polyester obtained in Examples 5, 6, 9 and 10 is spun in the molten state using a 12 bore spinerette at 1200 m/min, and is then drawn at 600 m/min, hot-plate treatment at 140° C. and ironing at 80° C.

A stocking formed from this yarn is dyed using a bath at 100° C. containing Bleu Palanil 3 RE (0.7% by weight) and a carrier (10% by weight).

Table 1 shows the characteristics. In said table, the luminosity was determined by a Gardner colorimeter. It should be noted that the greater the quantity of dye fixed by the fibre, the smaller the quantity of light reflected (luminosity) by it.

TABLE 1

| Linear polyester | Count dtex/fil. | Toughness | Elongation | Dye luminosity |
|---|---|---|---|---|
| Example 5 | 90/12 | 20.3 | 22.3 | 20.2 |
| Example 6 | 90/12 | 19.2 | 20.1 | 21.3 |
| Example 9 | 90/12 | 22.7 | 29.1 | 32 |
| Example 10 | 90/12 | 17.4 | 24.7 | 21.5 |

EXAMPLE 11

An autoclave is charged with 150 parts by weight of the precondensate of EXAMPLE 4, 3.5 parts by weight of phenylhydroxymethylphosphinic acid, 0.02% by weight of $GeO_2$ (referred to the weight of the precondensate) and 3% by weight (referred to the weight of the precondensate) of polyethyleneglycol having an hydroxyl termination, having an average molecular weight of 1540. Polymerization is carried out according to the procedure of EX. 5 and a linear copolymer is obtained, having the following specifications:

| Intrinsic viscosity | 0.55 |
|---|---|
| COOH | 18 milliequiv/kg |
| Tm. | 248° C. |
| LOI | 27 |
| Phosphorus | 0.42% |
| Diethyleneglycol contents | 1.4% |

EXAMPLE 12

An autoclave is charged with 150 parts by weight of the precondensate of EXAMPLE 4, 1.4 parts by weight of phenylhydroxymethylphosphinic acid, 0.04% by weight (referred to the weight of the precondensate) of phosphoric acid and $Sb_2O_3$, 0.1% by weight (referred to the weight of the precondensate) of sodium methylate and 5.3 parts by weight of the hydroxyethyl ester of the isophthalic-5-sodium sulphonate acid. Polymerization is carried out according to the procedure of EXAMPLE 5 and a linear copolymer is obtained, having the following specifications:

| Intrinsic viscosity | 0.54 |
|---|---|
| COOH | 16 meq./kg |
| Tm | 245° C. |
| LOI | 29 |
| Phosphorus | 0.52% |
| Diethyleneglycol contents | 1.8% |

We claim:

1. A flameproof linear polyester constituted by the polycondensation product of a dicarboxylic aromatic acid with an alkylene glycol, characterised by containing, bonded in the macromolecule, a phosphorus compound of formula:

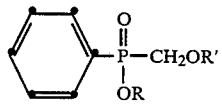

where R is a hydrogen atom, an alkyl group of 1 to 4 carbon atoms or a hydroxyalkyl group, and R' is a hydrogen atom, a hydroxyalkyl group or the group $-(CH_2CH_2O)_nH$, where n varies from 1 to 4, the quantity of said bonded monomer being such as to obtain a quantity of phosphorus (expressed as the metal) in the linear polyester of between 0.4 and 0.8% by weight.

2. A flameproof linear polyester as claimed in claim 1, characterised in that the hydroxyalkyl group in the phosphorus compound is $-CH_2CH_2OH-$.

3. A flameproof linear polyester as claimed in claim 1, characterised in that in the phosphorus compound, R is hydrogen or an alkyl of 1 to 4 carbon atoms, and R' is hydrogen.

4. A process for preparing the linear polyester as claimed in claims 1 to 3, characterised in that:

the dicarboxylic aromatic acid and the alkylene glycol are reacted together in a molar ratio of the order of 1:1.5 at a temperature in the range of 180°–240° C. and in the presence of a catalyst, until a precondensate is obtained having a molecular weight of between about 400 and about 1000;

the phosphorus compound is added to said precondensate;

the mixture is polycondensed at a temperature in the range of 265°–280° C. under a pressure decreasing from 760 torr to less than 1 torr in the presence of a catalyst, until the content of free carboxyl groups is reduced to a value of the order of 10–20 meq/kg.

5. A process as claimed in claim 4, characterised in that the dicarboxylic aromatic acid is chosen from terephthalic acid, isophthalic acid, 5-sulpho-isophthalic acid, naphthalene-2,6-dicarboxylic acid, diphenyl-para, para-dicarboxylic acid and para-phenylenediacetic acid.

6. A process as claimed in claim 4, characterised in that the alkylene glycol is chosen from ethylene glycol, 1,3-propanediol and 1,4-butanediol.

7. A process as claimed in claim 4, characterised in that for preparing the precondensate a catalyst is used chosen from amines, quaternary ammonium bases, metals, metal oxides and organic and inorganic metal salts, in a quantity of the order of 0.15–0.03% by weight with respect to the aromatic dicarboxylic acid.

8. A process as claimed in claim 4, characterised in that said precondensate has a molecular weight of the order of 500.

9. A process as claimed in claim 4, characterised in that for the polycondensation a catalyst is used chosen from metals, metal oxides, and organic and inorganic metal salts, in a quantity of the order of 0.1–0.3% by weight with respect to the aromatic dicarboxylic acid.

10. A process as claimed in claim 4, characterised in that the phosphorus compound is chosen from phenylhydroxymethylphosphinic acid and methyl and ethyl phenylhydroxymethylphosphinite.

11. Articles such as fibres, film and sheets, formed from the flameproof linear polyester as claimed in claims 1 to 3.

* * * * *

UNITED STATES PATENT AND TRADEMARK OFFICE
CERTIFICATE OF CORRECTION

PATENT NO. : 4,517,355

DATED : May 14, 1985

INVENTOR(S) : Giorgio Mercati, Armando Mariano, Fulvio Pertot, Antonio Glionna and Mario Ferri It is certified that error appears in the above—identified patent and that said Letters Patent is hereby corrected as shown below:

First page, after line "[22]", insert the following lines:

-- [30] Foreign Application Priority Data

April 22, 1982   Italy .......... 20873 A/82

September 24, 1982  Italy .......... 23416 A/82

Signed and Sealed this

Fourteenth Day of January 1986

[SEAL]

Attest:

DONALD J. QUIGG

Attesting Officer  Commissioner of Patents and Trademarks